(12) United States Patent
Favaretto

(10) Patent No.: US 8,030,810 B2
(45) Date of Patent: Oct. 4, 2011

(54) AUTOMOTIVE ELECTRIC MACHINE

(75) Inventor: Fabrizio Favaretto, Formigine (IT)

(73) Assignee: Ferrari S.p.A. (IT)

( * ) Notice: Subject to any disclaimer, the term of this patent is extended or adjusted under 35 U.S.C. 154(b) by 146 days.

(21) Appl. No.: 12/613,171

(22) Filed: Nov. 5, 2009

(65) Prior Publication Data

US 2010/0109455 A1    May 6, 2010

(30) Foreign Application Priority Data

Nov. 5, 2008 (IT) .............................. BO2008A0668

(51) Int. Cl.
*H02K 1/32* (2006.01)
(52) U.S. Cl. ............................................ 310/61; 310/59
(58) Field of Classification Search ................ 310/61, 310/60 R, 59, 58
See application file for complete search history.

(56) References Cited

U.S. PATENT DOCUMENTS

| | | | |
|---|---|---|---|
| 4,406,959 A * | 9/1983 | Harano et al. | 310/58 |
| 6,191,511 B1 | 2/2001 | Zysset | |
| 7,049,717 B2 * | 5/2006 | Frank et al. | 310/61 |
| 7,489,057 B2 * | 2/2009 | Zhou et al. | 310/61 |
| 7,579,725 B2 * | 8/2009 | Zhou et al. | 310/61 |
| 2003/0146667 A1 * | 8/2003 | Hattori et al. | 310/61 |
| 2005/0156471 A1 | 7/2005 | Kobayashi et al. | |
| 2006/0017335 A1 | 1/2006 | Matin et al. | |
| 2006/0066156 A1 | 3/2006 | Dong et al. | |

FOREIGN PATENT DOCUMENTS

| | | |
|---|---|---|
| AT | 293532 B | 10/1971 |
| DE | 2251841 A1 | 5/1974 |
| GB | 1283332 A | 7/1972 |
| JP | 2007-228669 A | 9/2007 |

OTHER PUBLICATIONS

"Italian Application Serial No. IT B020080668, Italian Search Report completed Aug. 5, 2009", 2 pgs.
"European Application Serial No. 09175179.2, Communication and European Search Report dated Nov. 27, 2009", 4 pgs.

* cited by examiner

*Primary Examiner* — Nguyen N Hanh
(74) *Attorney, Agent, or Firm* — Schwegman, Lundberg & Woessner, P.A.; Matthew Prater

(57) ABSTRACT

An automotive electric machine provided with: a stator; a rotor, which is rotationally mounted coaxially to the stator and inside the stator to rotate about a rotation axis; a shaft, which is rotationally mounted about the rotation axis, supports the rotor, and is hollow inside so as to have a longitudinal, central cooling channel filled with a cooling fluid; at least one pushing element, which is arranged inside the cooling channel, is integral with the shaft to rotate with the shaft itself about the rotation axis, and is helical-shaped to define at least one worm which extends within the cooling channel along the rotation axis to push the cooling fluid along the rotation axis due to its rotation.

20 Claims, 3 Drawing Sheets

AUTOMOTIVE ELECTRIC MACHINE

RELATED APPLICATION

This application claims the benefit of priority, under 35 U.S.C. Section 119, to Italian Patent Application Serial No. BO2008A 000668, filed on Nov. 5, 2008, which is incorporated herein by reference in its entirety.

TECHNICAL FIELD

The present document relates to an automotive electric machine.

BACKGROUND

Vehicles traditionally only have heat-engine traction, in which the driving torque is supplied only by a thermal internal combustion engine. In order to reduce polluting emissions and to reduce consumption, hybrid traction is becoming increasingly more popular, in which the driving torque is supplied by a thermal internal combustion engine and/or by an electric machine working as a motor. According to the type of motion of the vehicle and to the residual electric charge existing in the vehicle batteries, either only the thermal internal combustion engine or only the electric machine is used, or both are used in order to optimize fuel consumption and/or minimize polluting emissions. The electric machine may run as a motor, absorbing electricity and generating a mechanical driving torque, or as a generator, absorbing mechanical energy and generating electricity.

A problem which applies to automotive electric machines relates to the disposal of the heat produced by dissipation by the electric machine itself. In particular, while ensuring adequate cooling of the stator of the electric machine is relatively simple, ensuring adequate cooling of the rotor of the electric machine is not as straightforward. In other words, the heat produced in the stator may be easily evacuated by cooling it (e.g. with air or by means of a hydraulic circuit) because there are no problems of reachability, as it is static and arranged outside; on the contrary, in order to be evacuated, the heat produced in the rotor requires a more complex system due to the rotation of the rotor itself, which makes it more difficult to be reached, combined with the arrangement of the rotor inside the stator.

As described in patent applications JP2007228669A and US20050156471A1, for example, in order to cool the rotor of an electric machine, it has been suggested to provide a hollow shaft of the electric machine, i.e. provided with a longitudinal cooling channel; the first end of the cooling channel obtained within the shaft is connected to the delivery of a cooling circuit provided with a circulation pump and the second end, opposite to the first end, is connected to a cooling circuit inlet so that, in use, a stream of cooling fluid circulates through the cooling channel. However, such a solution is particularly complex and potentially not very reliable, because a passage for the cooling fluid needs to extend from a fixed part (the cooling circuit) to a movable part (the electric machine shaft) and vice versa. The passage of a cooling fluid from a fixed part to a movable part is particularly complex (and thus costly) to be made and always potentially exposed to the risk of leakage of cooling fluid.

In patent applications GB1283332A and US20060066156A1 it has been suggested to keep the longitudinal cooling channel of the electric machine shaft isolated and filled with cooling fluid; two heat exchangers are provided at the two ends of the shaft, which serve the function of removing heat from the shaft itself. In this case, the function of the cooling fluid present inside the cooling channel is to take the heat produced inside the rotor towards the ends of the shaft, where the heat is given to the heat exchangers. This solution has the considerable advantage of not needing a passage for cooling fluid that extends between a fixed part and a movable part, but on the other hand has a rather modest efficiency because the amount of heat carried by the cooling fluid present inside the cooling channel towards the ends of the shaft is relatively modest.

Patent U.S. Pat. No. 6,191,511B1 describes an asynchronous, liquid-cooled electric machine, which comprises a closed, liquid-cooling circuit which passes in sequence through the stator and the rotor shaft; a pump is incorporated in the rotor shaft and the cooling liquid is fed to the pump, by means of a static tube arranged axially inside the rotor shaft, and returns towards the stator passing between the rotor shaft and the static tube. The pump comprises a centrifugal pumping member, integral with a closed end of the rotor shaft, and longitudinal blades which are integral with the rotor shaft and are helical-shaped.

SUMMARY

Some of the examples described here provide an automotive electric machine which is free from the above-described drawbacks, while being easy and cost-effective to be implemented.

According to the present subject matter, an automotive electric machine is provided as claimed in the attached claims.

BRIEF DESCRIPTION OF THE DRAWINGS

The present subject matter will now be described with reference to the accompanying drawings, which illustrate a non-limitative embodiment thereof, in which.

DETAILED DESCRIPTION

Figure 1:
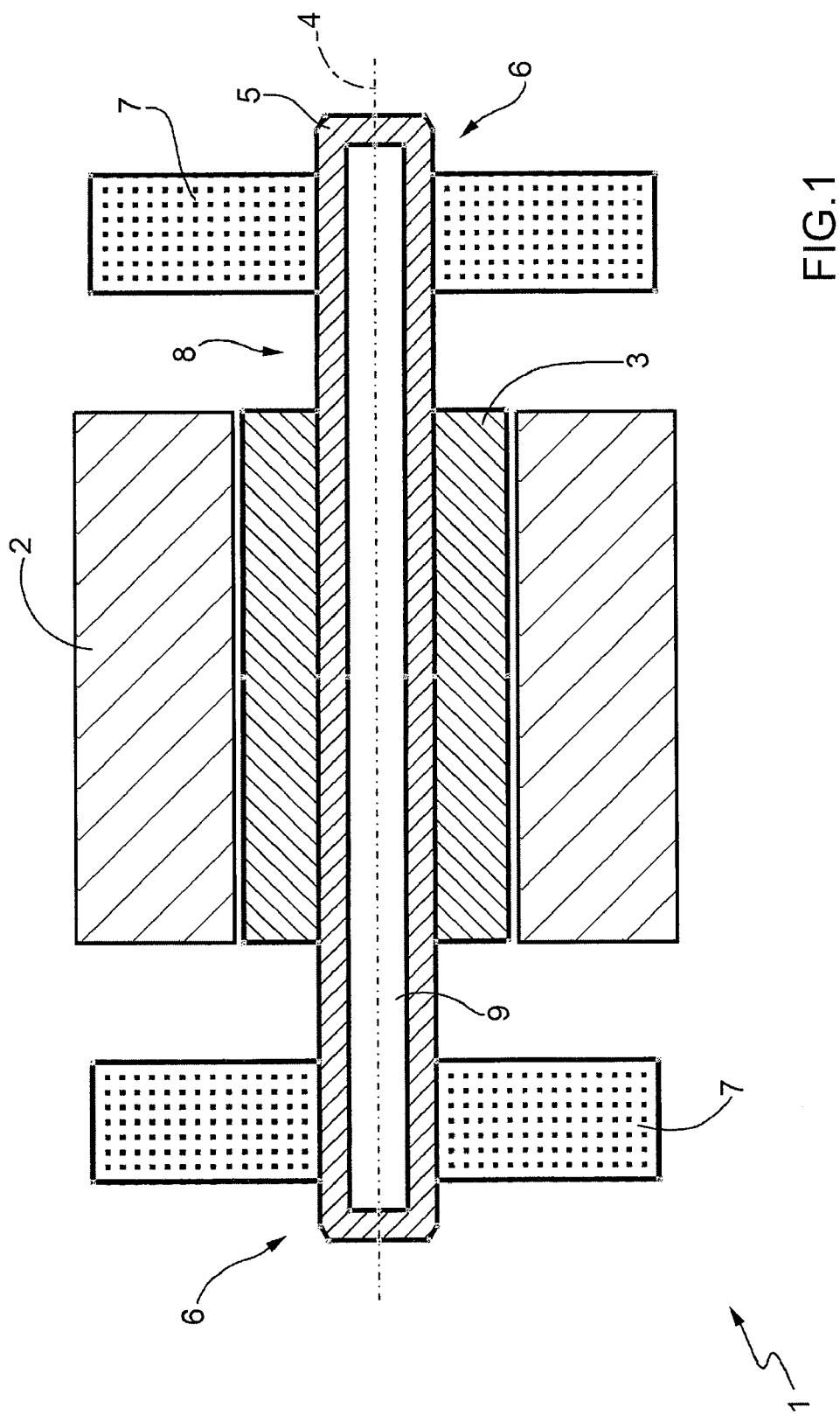
FIG. 1 is a diagrammatic view, in longitudinal section and with parts removed for clarity, of an automotive electric machine made according to the present subject matter.

In FIG. 1, numeral 1 indicates as a whole an automotive electric machine. The electric machine 1 comprises a stator 2 and a rotor 3, which is rotationally mounted coaxially to the stator 2 and inside the stator 2 itself to rotate about a rotation axis 4. In particular, the rotor 3 is keyed onto a shaft 5, which is rotationally mounted about the rotation axis 4.

Shaft 5 protrudes outwards from both sides of stator 2 and rotor 3, and two heat exchangers 7 which are thermally coupled to the shaft 5 for removing heat from the shaft 5 itself, are arranged at the two ends 6 of the shaft 5, which are arranged outside stator 2 and rotor 3.

According to a possible embodiment, each heat exchanger 7 is fixed (i.e. does not rotate but is integral with a frame supporting the electric machine 1) and has an annular heat exchanging surface which surrounds the shaft 5 at a very limited distance from the shaft 5 itself so as to promote the heat transmission from the external surface of shaft 5 to the annular heat exchanging surface itself.

According to a different embodiment, each heat exchanger 7 is fixed (i.e. does not rotate but is integral with a frame supporting the electric machine 1) and has an annular sealed chamber, which is crossed by shaft 5 and contains a cooling fluid that wets the outer surface of shaft 5.

According to a further embodiment, each heat exchanger 7 is rotational to and integral with the shaft 5 for rotating along with the shaft 5 itself; in this case, the heat exchanger 7 may serve the function of increasing the heat exchanging surface of the shaft 5 and/or may serve the function of addressing an air flow towards the shaft 5 itself.

Shaft 5 is hollow and a longitudinal, central cooling channel 8 is obtained therein that extends over the whole length of the shaft 5, is completely isolated from the outside and is filled with a cooling fluid 9. The cooling fluid 9 serves the function of taking the heat produced inside the rotor 3 towards the ends 6 of shaft 5, where the heat is given to the heat exchangers 7; in other words, the cooling fluid 9 needs to remove heat from the middle of the shaft 5 at the rotor 3 and give heat to the ends 6 of shaft 5 at the heat exchangers 7.

Two pushing elements 10 and 11 are arranged within the cooling channel 8, each of which is arranged inside the cooling channel 8, is integral with the shaft 5 to rotate along with the shaft 5 itself about the rotation axis 4, and is helical-shaped to define at least one worm which extends within the cooling channel 8 along rotation axis 4 to push the cooling fluid 9 along the rotation axis 4 due to its rotation. An inner pushing element 11 is concentric with the outer pushing element 10 and is arranged inside the outer pushing element 10.

Figure 2:
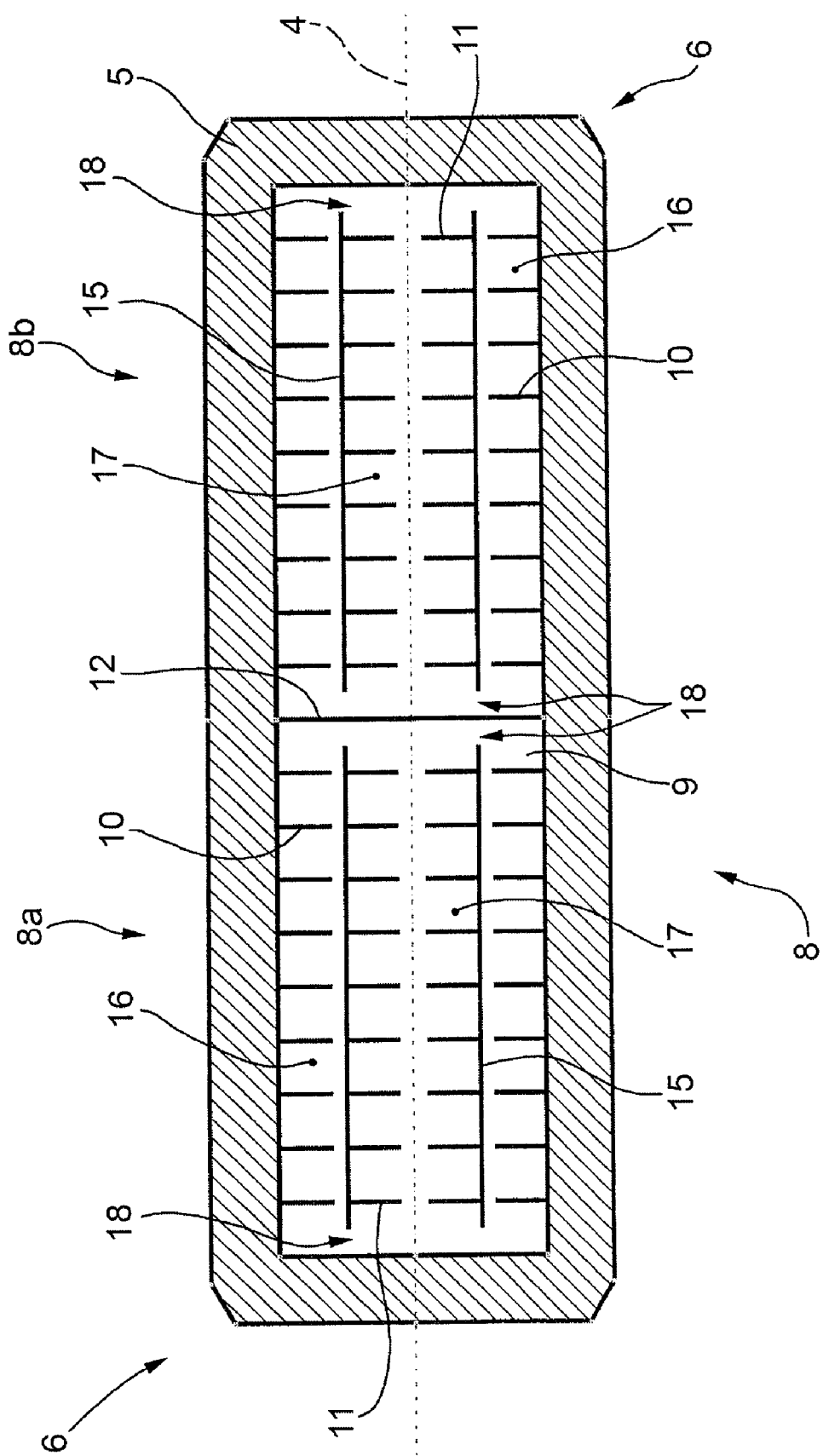
FIG. 2 is an enlarged-scale view of a shaft of the electric machine in FIG. 1.

According to a embodiment shown in FIG. 2, a middle partition wall 12 is provided that is arranged inside the cooling channel 8 to divide the cooling channel 8 into two reciprocally, specularly similar or identical (i.e., mirrored) halves 8a and 8b. Two pushing elements 10 and 11 are provided in each half 8a or 8b of the cooling channel 8, which are specularly similar or identical to the two pushing elements 10 and 11 present in the other half 8b or 8a of the cooling channel 8.

In each half 8a or 8b of the cooling channel 8, the outer pushing element 10 is shaped to push the cooling fluid 9 along the rotation axis 4 in a direction 13 which travels from the middle of the cooling channel 8 towards one end of the cooling channel 8 (i.e. towards the corresponding heat exchanger 7). Furthermore, in each half 8a or 8b of the cooling channel 8, the inner pushing element 11 is shaped to push the cooling fluid 9 along the rotation axis 4 in a direction 14 which is opposite to the direction 13 travelling from one end of the cooling channel 8 (i.e. from the corresponding heat exchanger 7) to the middle of the cooling channel 8.

A partitioning body 15 is provided in each half 8a or 8b of the cooling channel 8, which partitioning body has a tubular shape, is integral with the shaft 5 for rotating along with the shaft 5 about the rotation axis 4 and is arranged inside the cooling channel 8 between the inner pushing element 11 and the outer pushing element 10 so as to define an outer chamber 16 accommodating the outer pushing element 11, and an inner chamber 17 accommodating the inner pushing element 10. In each half 8a or 8b of the cooling channel 8, the partitioning body 15 has a smaller longitudinal dimension than the longitudinal dimension of half 8a or 8b of the cooling channel 8 and is centered on the half 8a or 8b of the cooling channel to define an annular passing aperture 18 between each end of the partitioning body 15 and the corresponding end of the half 8a or 8b of cooling channel 8.

According to alternative embodiments, each pushing element 10 or 11 may comprise a single helix or may comprise several helixes starting and ending on the same respective circumferences.

According to an alternative embodiment (not shown), a single heat exchanger 7 is included, arranged at one end 6 of the shaft 5; in this embodiment, the middle wall 12 is not present and the pushing elements 10 and 11 are shaped to circulate the cooling fluid 9 from one end 6 of shaft 5 to the other end 6 of the shaft.

Figure 3:
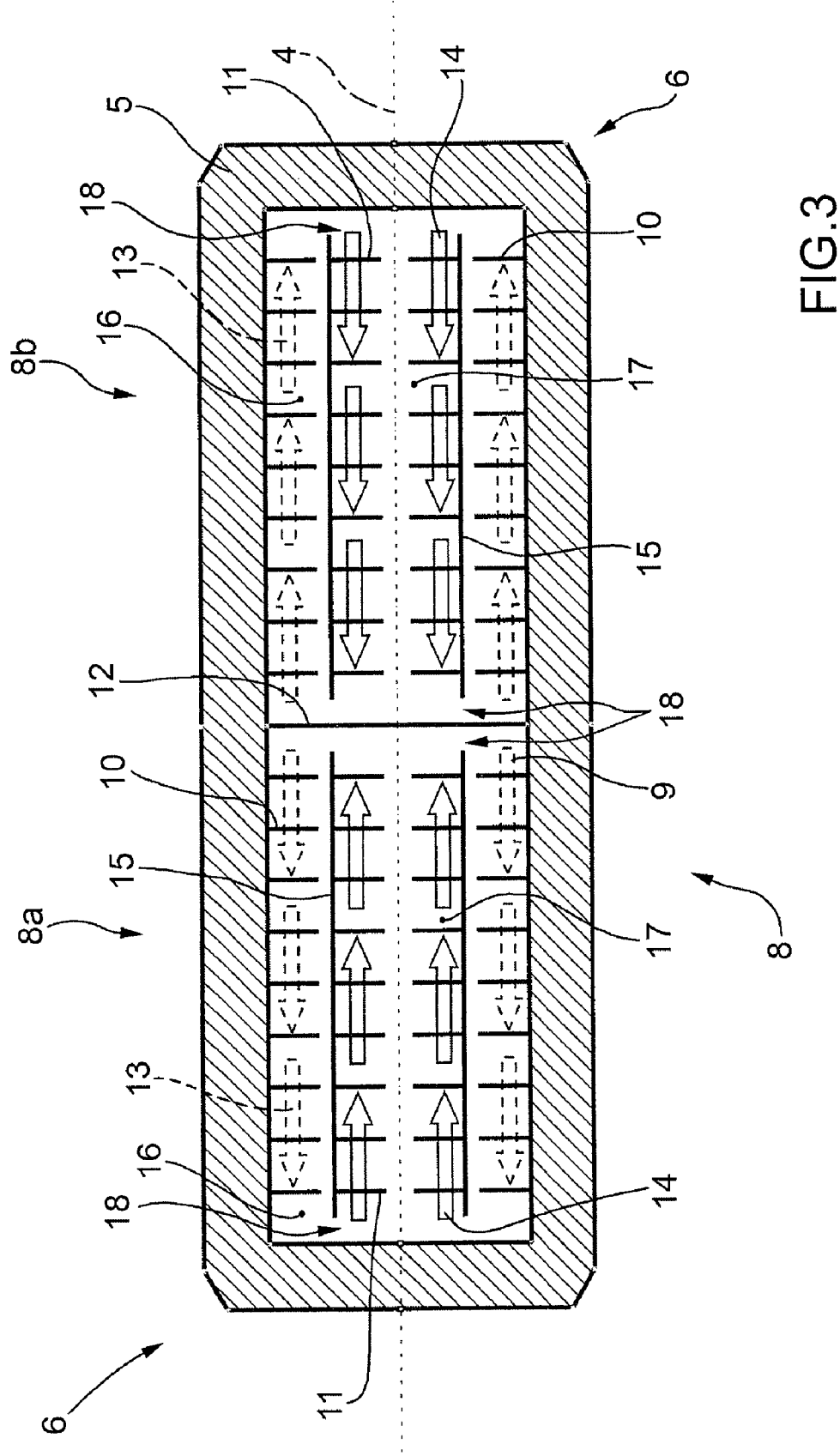
FIG. 3 is a view of the shaft in FIG. 2 showing the flows of a cooling fluid contained in a longitudinal cooling channel when the shaft rotates.

The operation of the above-described cooling system of rotor 3 is described below with reference to FIG. 3.

The rotation of shaft 5 about the rotation axis 4 determines the rotation of the pushing elements 10 and 11 of each half 8a or 8b of the cooling channel 8, and therefore causes a push on the cooling fluid 9 in the direction 13 in each outer chamber 16, and a push in the direction 14 in each inner chamber 17. Therefore, a stream of cooling fluid 9 is established in each half 8a or 8b of the cooling channel 8, which cyclically moves along a closed loop path; at the ends of chambers 16 and 17, the cooling fluid 9 flows from an outer chamber 16 to an inner chamber 17 and vice versa, through the corresponding annular passages 18.

The stream of fluid 9 along the closed loop path provides a heat exchange both from the rotor 3 to the cooling fluid 9 in the central portion of shaft 5, and from the cooling fluid 9 to the heat exchangers 7 at the ends 6 of shaft 5. Thereby, the effectiveness of cooling the rotor 3 is very high, because the heat amount carried by the cooling fluid 9 present inside the cooling channel 8 towards the ends 6 of shaft 5 is remarkable.

Cooling the above-described electric machine 1 is considerably advantageous. First, the cooling of the above-described electric machine 1 is simple and quick to be carried out, because no passage of cooling fluid 9 is provided between a fixed part and a movable part. Furthermore, the cooling of the above-described electric machine 1 is very effective because it is able to dispose of a high amount of heat between the two heat exchangers 7.

The invention claimed is:

1. An automotive electric machine including:
    a stator;
    a rotor that is rotationally mounted coaxially to the stator and inside the stator to rotate about a rotation axis;
    a shaft that is rotationally mounted about the rotation axis, supports the rotor, and is hollow inside so as to have a longitudinal, central cooling channel filled with a cooling fluid;
    at least a first pushing element that is arranged inside the cooling channel to rotate with the shaft about the rotation axis and to define at least one worm which extends within the cooling channel along the rotation axis to push the cooling fluid along the rotation axis and in a first direction due to its rotation; and
    at least a second pushing element that is concentrically arranged inside the first pushing element to rotate with the shaft about the rotation axis and to define at least one worm which extends within the cooling channel along the rotation axis to push the cooling fluid along the rotation axis and in a second direction opposite to the first direction.

2. An electric machine according to claim 1, wherein the at least a first pushing element is integral with the shaft.

3. An electric machine according to claim 1, wherein the at least a first pushing element is helical-shaped.

4. An electric machine according to claim 1, wherein the at least a second pushing element is integral with the shaft.

5. An electric machine according to claim 1, wherein the at least a second pushing element is helical-shaped.

6. An electric machine according to claim 1 and comprising a partitioning body to rotate with the shaft about the rotation axis, the partitioning body arranged inside the cooling channel between the first pushing element and the second pushing element to define a first chamber accommodating the first pushing element and a second chamber accommodating the second pushing element.

7. An electric machine according to claim 6 wherein the partitioning body has a tubular shape.

8. An electric machine according to claim 6 wherein the partitioning body is integral with the shaft.

9. An electric machine according to claim 6, wherein the partitioning body has a longitudinal dimension smaller than the longitudinal dimension of the cooling channel so as to define an annular passing aperture between the two chambers between each end of the partitioning body and the corresponding end of the cooling channel.

10. An electric machine according to claim 1 and comprising a middle partition wall that is arranged inside the cooling channel to divide the cooling channel into two halves; at least two first and two second pushing elements are provided, each of which is arranged in a corresponding half of the cooling channel.

11. An electric machine according to claim 10, wherein the halves are reciprocally, specularly identical.

12. An electric machine according to claim 10, wherein the two second pushing elements are reciprocally, specularly identical.

13. An electric machine according to claim 1, wherein each pushing element comprises several helixes starting and ending on the respective same circumferences.

14. An electric machine according to claim 1, wherein the cooling channel of the shaft is isolated from a space outside the shaft.

15. An electric machine according to claim 1, wherein the shaft protrudes from at least one side of the stator and the rotor, with a heat exchanger thermally coupled to the shaft to remove heat from the shaft, the heat exchanger arranged at the end of the shaft and outside the stator and the rotor, wherein the cooling fluid is to carry heat produced inside the rotor towards the end of the shaft where the heat is transmitted to the heat exchanger.

16. An electric machine according to claim 15, wherein the shaft protrudes from both sides of the stator and the rotor, with two heat exchangers thermally coupled to the shaft to remove heat from the shaft, the two heat exchanger arranged at the two ends of the shaft with the two heat exchanger are arranged outside the stator and the rotor.

17. An electric machine according to claim 16 and including:
- a partitioning body that has a tubular shape, is integral with the shaft to rotate with the shaft about the rotation axis and is arranged inside the cooling channel between the first pushing element and the second pushing element so as to define a first chamber accommodating the first pushing element and a second chamber accommodating the second pushing element; and
- a middle partition wall, which is arranged inside the cooling channel to divide the cooling channel into two reciprocally, specularly identical halves; two first and two second reciprocally, specularly identical pushing elements are provided, each of which is arranged in a corresponding half of the cooling channel.

18. An electric machine according to claim 17, wherein:
each first pushing element is concentrically arranged inside the second pushing element and is shaped to push the cooling fluid from one end of the cooling channel towards the middle of the cooling channel;
each second pushing element is concentrically arranged outside the first pushing element and is shaped to push the cooling fluid from the middle of the cooling channel towards one end of the cooling channel; and
the partitioning body has a longitudinal dimension smaller than the longitudinal dimension of the cooling channel so as to define an annular passing aperture between the two chambers between each end of the partitioning body and the corresponding end of the cooling channel.

19. An electric machine according to claim 1, wherein:
the first pushing element is concentrically arranged inside the second pushing element and is shaped to push the cooling fluid from one end of the cooling channel towards the middle of the cooling channel; and
the second pushing element is concentrically arranged outside the first pushing element and is shaped to push the cooling fluid from the middle of the cooling channel towards one end of the cooling channel.

20. An electric machine according to claim 1, wherein cooling fluid is sealed in the shaft.

* * * * *